United States Patent [19]

Braun et al.

[11] E Patent Number: Re. 33,243

[45] Reissued Date of Patent: Jun. 26, 1990

[54] PROCESS FOR TREATING A METAL OXIDE POWDER

[75] Inventors: Camille Braun, Saint Nizier du Moucherotte; Joël Danroc, Grenoble; Bernard Francois, Montbonnot; Jean Michel, Biviers, all of France

[73] Assignee: Commissariat a l'Energie Atomique, Paris, France

[21] Appl. No.: 296,714

[22] Filed: Jan. 13, 1989

Related U.S. Patent Documents

Reissue of:

[64] Patent No.: 4,617,158
Issued: Oct. 14, 1986
Appl. No.: 484,419
Filed: Apr. 12, 1983

[30] Foreign Application Priority Data

Apr. 19, 1982 [FR] France ..... 82 06677

[51] Int. Cl.[5] ..... G21F 9/16; B22F 1/00; B22F 3/12

[52] U.S. Cl. ..... 264/0.5; 252/628; 252/643; 419/34; 419/35; 419/38; 419/57; 419/58; 419/63; 419/64; 419/66

[58] Field of Search ..... 264/0.5; 252/628, 635, 252/636, 638, 643; 419/5, 6, 8, 7, 9, 34, 35, 38, 57, 58, 63, 64, 66; 423/251, 252, 253, 260, 261

[56] References Cited

U.S. PATENT DOCUMENTS

| | | | |
|---|---|---|---|
| 3,224,944 | 12/1965 | Turner et al. | 264/0.5 |
| 3,375,306 | 3/1968 | Russell et al. | 264/0.5 |
| 3,408,304 | 10/1968 | Kosiancic | 252/635 |
| 3,420,640 | 1/1969 | Porter | 252/643 |
| 3,531,416 | 9/1970 | Akutsu et al. | 252/635 |
| 3,761,547 | 9/1973 | Grossman et al. | 264/0.5 |
| 3,872,022 | 3/1972 | De Hollander et al. | 264/0.5 |
| 4,002,778 | 1/1977 | Bellis et al. | 427/98 |
| 4,052,330 | 10/1977 | Jensen et al. | 264/0.5 |
| 4,069,295 | 1/1978 | Sugahara et al. | 423/49 |
| 4,134,941 | 1/1979 | Hrovat et al. | 264/0.5 |
| 4,401,608 | 8/1983 | Smith | 252/638 |
| 4,438,050 | 3/1984 | Dorr et al. | 264/0.5 |

*Primary Examiner*—Howard J. Locker
*Attorney, Agent, or Firm*—Oblon, Spivak, McClelland, Maier & Neustadt

[57] ABSTRACT

The invention relates to a process for the treatment of a metal oxide powder, particularly a $UO_2$ or $PuO_2$ powder, with a view to its fritting.

This process consists of oxidizing the powder, so as to form on its surface a hydrated oxide layer of the same metal. When the oxide is $UO_2$ or $PuO_2$ and mixtures thereof, as well as those prepared with $ThO_2$, the treated powder can be used for producing nuclear fuel pellets by cold compression, followed by fritting.

7 Claims, No Drawings

PROCESS FOR TREATING A METAL OXIDE POWDER

Matter enclosed in heavy brackets [ ] appears in the original patent but forms no part of this reissue specification; matter printed in italics indicates the additions made by reissue.

BACKGROUND OF THE INVENTION

The present invention relates to a process for treating metal oxide powders or granules in order to make them more suitable for compacting and fritting.

More specifically, it relates to the treatment of metal oxides, which can have several valency states and can give rise to the formation of hydrated oxides.

In particular, such oxides can be constituted by uranium dioxide, or plutonium dioxide, used in the pure state or in mixtures, or mixed with thorium dioxide, i.e. oxides usable for the production of nuclear fuel pellets, which may also contain temporary neutron absorbents such as $Gd_2O_3$, $Eu_2O_3$, etc.

One of the standard processes for producing nuclear fuel pellets from powders of these oxides, consists of bringing the powder into pellet form by cold compression and then subjecting the thus obtained crude pellets to natural fritting at an appropriate temperature. Following fritting, the fritted pellets firstly undergo a grinding treatment, so that they have the requisite geometrical characteristics and then inspection operations, in order to check whether or not they are in accordance with specifications.

The performance of these different stages involves numerous more or less automated manipulations of the pellets in both the crude and fritted states, which causes problems due to the brittleness of the pellets in both these states. Thus, the pellets are sensitive to impacts occurring during transfers and manipulations and more particularly therefore on their sharp edges when in the crude state. These impacts lead to defects, or cracking of splintering of the material and these prejudicial effects are not cured by the fritting treatment. For example, in certain cases, approximately 15% of the fritted pellets have 1 to 4 $mm^2$ surface cracks or chips, particularly on their edges.

Thus, during the final inspection, certain of these pellets are considered to be unacceptable and are discarded. They can be transformed into powder, which can then be recycled after an appropriate treatment. However, this recycling involves additional operations and leads to a slight reduction in the quality of the pellets obtained from the recycled powder.

It would therefore be advantageous to improve the mechanical behaviour of the crude pellets and in particular their stability and impact resistance, because they have a considerable influence on the quality of the finished product and on production efficiency. Thus, the surface faults mainly caused during the production of the crude pellet, can be aggravated by manipulations and subsequent operations, such as the grinding of the fritted pellets.

In order to improve the mechanical behaviour of the crude pellets, a small proportion of organic binder, e.g. polyvinyl alcohol is added to the oxide powder, which makes it possible to increase the tensile strength of the crude pellets from 0.3 to approximately 0.6 $MNm^{-2}$ and to bring about a marked reduction in the number of pellets having surface cracks and chips, so that the damaged pellets only represent 8% of the total number produced. However, the need to use a binder leads to certain disadvantages because it is necessary to add the binder in aqueous solution and then remove it during prefritting, which leaves behind solid carbonaceous residues, which can be prejudicial to the satisfactory fritting of the pellets.

Consideration has also been given to subjecting the initial oxide powder to a treatment, which consists of cold compressing the powder in order to obtain tablets, then crushing the tablets to obtain granules and adding to the latter approximately 0.3% of organic binder, before cold compressing them to obtain better quality crude pellets.

However, this process also suffers from the disadvantage of requiring on the one hand, the addition of the organic binder which must then be removed during fritting and, on the other hand, the performance of supplementary compression and crushing stages.

SUMMARY OF THE INVENTION

The problem of the present invention is a process for the treatment of a metal oxide powder, which in particular makes it possible to improve by a factor of approximately 1.5 to 3 the tensile strength of the crude pellets obtained by the cold compression of the thus treated powder. This process consists of forming, by oxidation of the said powder, an adhesive hydrated oxide layer of the same metal on the surface of the particles forming the powder.

As has been stated hereinbefore, the metal oxide which can undergo such a treatment is a metal oxide which can have several valency states and can give rise to the formation of an adhesive hydrated oxide layer.

Examples of such oxides are those of uranium, plutonium, iron, vanadium, molybdenum, niobium, cerium, copper and cobalt.

Advantageously, the metal oxide is uranium dioxide, plutonium dioxide or a mixed oxide of $UO_2$-$PuO_2$, $UO_2$-$ThO_2$ or $PuO_2$-$ThO_2$. The process also applies to nuclear fuel oxides containing temporary neutron absorbents ($GdO_{23}$, $Eu_2O_3$), or to mixed oxides such as $UO_2$-$Gd_2O_3$, $UO_2$-$PuO_2$-$Eu_2O_3$ and $UO_2$-$PuO_2$-$Gd_2O_3$.

In the case of uranium dioxide $UO_2$, hydration leads to a hydrated oxide according to formula $[UO_2(OH)_2]$, $H_2O$ or the overall simplified formula $UO_3$, $2H_2O$.

The presence, according to the invention, of an adhesive hydrated oxide surface layer greatly improves the behaviour of the powder during its conversion into crude pellets by compression. The treated powder causes a better pressure transmission and consequently the density distribution within the pellets is more homogeneous and there is a reduced deformation of the pellets during fritting. This makes it possible to obtain fritted pellets which are closer to the cylindrical state and consequently minimizes and simplifies the grinding operations for adjusting, after fritting, the dimensions of the pellets obtained. In the same way, there is a better cohesion of the powder in the crude pellets. These results are due to the presence of the molecule of water associated with the oxides forming the hydrated oxide surface layer.

In addition, the increase in the volume associated with the decompression and mould removal of the crude pellets is reduced. Thus, the faults, cracks, flaking and destruction of the pellets, which sometimes occur during the mould removal operation are much less frequently encountered.

In industrial pellet production installations, very high and the decompression and mould removal operations in each case only last about 0.5 seconds. Therefore, during decompression, where stresses are released very rapidly, the volume variation can be considerable and can lead to a partial or total destruction of the crude pellet. As a result of the treatment of the starting powder by a process according to the invention, it is possible to minimise the phenomena due to the release of stresses and strains.

Moreover, the crude pellets prepared from the superficially oxidohydrated powders, are less brittle and much less sensitive to impacts. In addition, their tensile strength which is an indication of their quality, is higher and is e.g. increased by a factor of approximately 2 compared with crude pellets obtained from an untreated powder and 30% better than crude pellets obtained from granules to which has been added 0.3% of organic binder.

Finally, the use of a metal oxide powder, which has undergone a hydration or preferably surface oxidohydration process, make it possible to use during the cold compression operation, a smaller quantity of lubricant, such as zinc stearate, e.g. 0.1% instead of 0.3% in the prior art processes, thereby reducing the dirtying of the fritting furnaces.

According to the invention, it is possible to carry out the oxidohydration by treating the metal oxide powder in a humid air atmosphere for a time sufficient to form the said hydrated oxide layer.

Preferably, this treatment is performed at a temperature above ambient temperature, but at the most equal to 90° C., when the oxide powder is a uranium dioxide power, because the hydrated compound complying in this case with the formula $[UO_2(OH)_2]$, $H_2O$ decomposes at a temperature above 90° C. When the oxidohydration treatment is performed at a temperature above ambient temperature, at least 10 days are required to obtain the hydrated oxide surface layer. In the case of a $UO_2$ powder, this time is approximately 10 days, when working at 80° C. in air with an 80% moisture content and approximately 15 days at 60° C. in air with an 80% moisture content.

Thus, the time taken by this treatment is too long for industrial production, where the average daily production is approximately 1 tonne. Thus, said treatment would require excessively large storage surfaces of approximately 1500 $m^2$ and would at least double the cycle time taken for converting the oxide powder into the finished product.

According to the invention, preference is given to performing the oxidohydration by treating the powder with an oxidizing agent, such as hydrogen peroxide or ozone, in the presence of water or water vapour.

When the oxidizing agent is hydrogen peroxide, the treatment is preferably performed by using an aqueous hydrogen peroxide solution, and the powder is mixed therewith and then the thus treated powder undergoes drying to eliminate the excess water.

The use of a hydrogen peroxide solution has the advantage of causing no pollution of the metal oxide powder and causes no complications during the subsequent fritting process. Thus, this solution only contains the two constituents indispensable for the formation of the hydrated oxide layer.

Generally, the hydrogen peroxide solution is mixed with the powder by atomizing the solution onto a moving powder bed.

The hydrogen peroxide concentration of the solution is advantageously between 4 and 30%. In the case of concentrated solutions (30% $H_2O_2$) a $UO_4$, $xOH_2$ layer with x=2 to 4 is also formed, which gives good results and which can be decomposed again into $UO_2$, $2H_2O$. The 30% hydrogen peroxide solution is not an upper limit and a higher concentration is possible. The hydrogen peroxide solution is preferably added in a quantity such that it represents 2 to 15% by weight of the metal oxide powder to be treated. Although it is possible to envisage a quantity above 15%, it is inadvisable because it leads to excessively wet products.

Following the atomization of the hydrogen peroxide solution, the excess free water which has not participated in the formation of the hydrated oxide is removed by drying the treated powder at either ambient temperature or a higher temperature of at the most 90° C., when the treated powder is uranium dioxide.

Thus, the presence of free water does not have a favourable effect during the subsequent compression and fritting stages. Moreover, when there is more than 3 or 4% of free water compared with the treated powder weight, it leads to the destruction of the crude pellets during their removal from the mould.

According to a variant it is possible to carry out the oxidohydration of the powder by using a hydrogen peroxide solution in the vapour state, which makes it possible to carry out the treatment faster. In this case, the powder is placed in a container, which is open at its upper end and which is placed above a certain mass of the aqueous hydrogen peroxide solution, e.g. an aqueous solution topped up to 30% hydrogen peroxide, which is moderately heated to form the quantity of hydrogen peroxide vapour necessary for the treatment of the powder.

According to the invention, when the powder is uranium dioxide, the oxidohydration treatment is preferably carried out in such a way as to obtain a hydrated oxide layer of $UO_3$, $2H_2O$ representing 3 to 35 mole % of the treated $UO_2$ powder.

According to the invention, the oxide powders undergoing the oxidohydration treatment can have various dimensions and can even be in the form of granules with a grain size up to 1 mm.

The process according to the invention is more particularly applicable to the production of the uranium dioxide pellets. In this case, after subjecting the uranium dioxide powder to the oxidohydration treatment according to the invention, so as to form on the surface thereof an adhesive hydrated oxide layer $[UO_2(OH)_2]$, $H_2O$, the powder is brought into the form of cylindrical pellets by cold compression, after preferably adding thereto a lubricant such as zinc stearate. The thus obtained crude pellets are fritted at a temperature of 1400° to 1800° C. in a reducing atmosphere, such as hydrogen.

DESCRIPTION OF THE PREFERRED EMBODIMENTS

The invention is described in greater detail hereinafter with respect to the following examples given in an illustrative and non-limitative manner.

EXAMPLE 1

A batch of 1 kg of $UO_2$ powder with a specific surface area of 2 $m^2/g$ is introduced into a rotary apparatus.

20 $cm^3$ of a 30% hydrogen peroxide solution, representing 2% by weight of the mass of $UO_2$, are then atomized onto the powder. The atomization operation is carried out in a few minutes on the surface of the powder bed, so as to ensure a homogeneous-dispersion of the liquid reagent droplets. The thus treated powder batch then undergoes drying for 1 hour in an oven at 60° C., in order to ensure that the excess liquid water is eliminated and that the hydrated oxide surface layer is formed, whilst modifying the properties of the powder.

The powder then undergoes cold compression at a pressure of 350 MPa, in order to form crude cylindrical pellets having a diameter of 10 mm and a height of 30 mm.

Their tensile strength is determined. It reaches 0.86 $mm/cm^2$, which is more than double the value obtained with crude pellets prepared under identical conditions from an untreated oxide powder. Moreover, it is found that the pellets have less faults and cracks on their edges.

After fritting for 4 hours at 1700° C., under a hydrogen atmosphere, the fritted pellets have a density equal to 98% of the theoretical density of uranium dioxide, like fritted pellets obtained from untreated powder, so that the surface oxidohydration process maintains the quality of the pellets.

EXAMPLE 2

Similar results are obtained by the compression and fritting under the same conditions of 1 kg of $UO_2$ powder, exposed for 10 days in an oven to a temperature of approximately 80° C. and with an air atmosphere with an 80% moisture content.

EXAMPLES 3 TO 6

These examples relate to the preparation of fritted uranium dioxide pellets by using as the starting powder, uranium dioxide powder which has undergone a surface oxidohydration treatment by means of aqueous solutions containing different hydrogen peroxide concentrations.

In each example, use is made of a 1 kg uranium dioxide powder batch having a specific surface area of 2 $m^2$g.1 kg of this powder is introduced into a rotary mixer, in order to ensure its mixing and onto the mixed powder is atomized by means of a spray gun 40 $cm^3$ (i.e. 4% by weight of the $UO_2$ mass) of a hydrogen peroxide solution having hydrogen peroxide concentrations varying as a function of the examples. After atomization, the treated powder batch undergoes drying in an over at 60° C., with theodore in the form of a thin bed having a thickness of approximately 1 cm. After drying for 2 hours, $UO_3$, $2H_2O$ surface layer is obtained and the excess water eliminated.

It is also possible to carry out drying in a rotary tube at a substantially identical temperature for 30 minutes. The thus treated powder is then mixed with a small quantity of approximately 0.2% by weight of finely pulverized solid lubricant, constituted by micronized zinc stearate and by cold compression under a pressure of 350 MPa, it is then converted into cylindrical pellets, having a diameter of 10 mm and a height of 13 mm. Part of the thus obtained crude pellets undergoes destructive tensile strength tests by the "Brazilian testing method", whilst the other part of the pellet is fritted at 1700° C., under a hydrogen atmosphere, for 4 hours.

After fritting, the density and the "diabolo" effect of the pellets obtained are measured. They are then subject to grinding and after this treatment examination takes place of the material defects present on the cylindrical part of the edges, which makes it possible to evaluate the quality of the finished product.

It is pointed out that the "Brazilian test" consists of crushing, along two opposing generatrixes, cylindrical pellets in order to bring about the splintering thereof, which enables their compressive strength to be determined. Their tensile strength is then determined by carrying out a conversion. The measurement of the "diabolo effect" has the effect of determining the divergence from the cylindrical geometry of the pellets.

Thus, during fritting, crude cylindrical pellets are deformed, which leads to a contraction of their median area, which then has a diameter $\phi 2$ less than the diameter $\phi 1$ of the two ends of the pellet. The diabolo effect is determined by the difference $\phi 1 - \phi 2$.

The results obtained with respect to the tensile strength and the diabolo effect are given in table 1, which also shows, for information purposes, the results obtained on producing, under the same conditions, fritted uranium dioxide pellets from a powder which has not undergone an oxidohydration treatment by the hydrogen peroxide solution.

It can be seen from this table that the tensile strength values of the crude pellets are considerably improved compared with those of pellets obtained from the untreated powder. It can also be seen that the diabolo effect is very low for pellets obtained from the powder treated in accordance with the invention.

The apparent density of all the fritted pellets is high (98% of the theoretical value) and the average diameter of the fritted pellets is 8.25 mm.

Following grinding, a comparative examination of material deficiencies present on the fritted pellets obtained from the powders which have undergone a treatment according to the invention, reveals that the percentage of damage leading to discarding is zero. 5% of the fritted pellets obtained have lesser damage phenomena (1 to 2 $mm^2$). In the case of fritted pellets obtained from powders which have not undergone the oxidation treatment, 15% of the pellets suffer from damage between 1 and 4 $mm^2$.

Thus, the treatment according to the invention makes it possible to significantly improve the stability of crude pellets and the final quality of the fritted pellets obtained. Moreover, good results are obtained with solutions having a $H_2O_2$ concentration as low as 8% by volume.

EXAMPLE 7

Identical results were obtained by atomizing the same quantities of the same hydrogen peroxide solutions on $UO_2$ granules. For example, a powder batch undergoes compression at 100 MPa, giving tablets with a density of approximately 50% of the theoretical value. By dry crushing, these tablets are brought into the form of granules with a size below 1 mm. These granules then undergo the oxidohydration treatment defined in the aforementioned examples. They are then converted into pellets under identical conditions.

EXAMPLE 8

The oxidohydration treatment described in example 4 is applied to the same $UO_2$ powder The latter is then mixed with thorium powder having a specific surface of 7 $m^2/g$, in variable weight proportions. Thus, e.g. two homogeneous mixtures are produced containing respectively 30 and 60% of $UO_2$.

The mixtures, as well as the elementary constituents $ThO_2$ and $UO_2$ treated are then converted into tablets, in the same way as described in example 4. The tensile strength measured on these crude tablets has the values given in table 2, which also gives the values obtained under identical conditions with crude, untreated $UO_2$ powder. As in example 4, the pellets obtained from the crude pellets have better qualities when using treated $UO_2$.

EXAMPLE 9

A homogeneous mixture of $UO_2$ powder already described in example 1, and 20% by weight of $PuO_2$ powder is converted by compression under 100 MPa and dry crushing into porous granules with a size at the most equal to 1 mm. These granules are mixed in a mixer, then receive a surface atomization of 4 $cm^3$ of 8% hydrogen peroxide solution, which is absorbed in the porosity of the granules. After natural drying and the addition of 0.15% by weight of finely micronized zinc stearate, these treated granules are converted into crude cylindrical tablets under a pressure of 400 MPa.

The tensile strength of these tablets is then 1.5 $MN.m^{-2}$, whereas it would be 0.6 $MN.M^{-2}$ without the oxidohydration treatment. Following fritting, the samples obtained are of a better quality and are less deformed, whilst their edges are only slightly damaged.

EXAMPLE 10

$UO_2$-$PuO_2$ tablets are prepared as in example 9, but by using 30 $cm^3$ of 12% hydrogen peroxide solution instead of 40 $cm^3$ of 8% hydrogen peroxide solution. Results obtained are identical to those of example 9.

EXAMPLE 11

A homogeneous $UO_2$ powder mixture already described in example 1, and 8% by weight of $G_2O_3$ powder is converted by compression under 100 MPa and dry crushing into porous granules with a size of at the most 1 mm. These granules are placed in a mixer, where they are mixed and then receive a surface atomization of 30 $cm^3$ of 20% hydrogen peroxide solution, which is absorbed in the porosity of the granules. After natural drying and adding 0.15% by weight of finely micronized zinc stearate, these treated granules are converted into crude cylindrical tablets under a pressure of 400 MPa.

The tensile strength of these tablets is then 0.9 $MN.m^{-2}$, whereas it would be 0.33 $MN.m^{-2}$ in the absence of the oxidohydration treatment. After fritting, the samples obtained are of a better quality, are less deformed and their edge are less damaged.

EXAMPLE 12

A homogeneous mixture of impoverished $UO_2$ powder containing 5% by weight of $PuO_2$ and 8% by weight of $Eu_2O_3$ powder is converted by compression under 100 MPa and dry crushing into porous granules having a size of at the most 1 mm. These granules are mixed in a mixer and then receive a surface atomization of 30 $cm^3$ of 20% hydrogen peroxide solution, which is absorbed in the porosity of the granules. After natural drying and the addition of 0.15% by weight of finely micronized zinc stearate, these treated granules are converted into crude cylindrical tablets, under a pressure of 400 MPa.

The tensile strength of these tablets then reaches 0.75 $MN.m^{-2}$, whereas it would be 0.43 MN.mhu $-2$ in the absence of the oxidohydration treatment.

After fritting, the samples obtained are of better quality, are less deformed and their edges are less damaged.

EXAMPLE 13

$UO_2$-$PuO_2$-$Gd_2O_3$ tablets are prepared in the same way as in example 12 by replacing the $Eu_2O_3$ powder by $Gd_2O_3$ powder. The results obtained are identical to those of example 12.

TABLE 1

| EXAMPLES Reference No. | ATOMIZATION Solution quantity ($cm^3$/kg of $UO_2$) | $H_2O_2$ concentration (%) | CRUDE PELLET Tensile strength ($MN\ m^{-2}$) | FRITTED PELLET Diabolo effect (mm) |
|---|---|---|---|---|
| | 0 | 0 | 0.33 | 0.07 |
| 3 | 40 | 4 | 0.55 | 0.04 |
| 4 | 40 | 8 | 0.75 | 0.03 |
| 5 | 40 | 16 | 0.90 | 0.03 |
| 6 | 40 | 30 | 1.05 | 0.03 |

TABLE 2

| | TENSILE STRENGTH OF THE CRUDE TABLETS ($MN.\ m^{-2}$) | | | |
|---|---|---|---|---|
| Type of powder | pure $UO_2$ | $ThO_2$ + 60% $UO_2$ | $ThO_2$ + 30% $UO_2$ | pure $ThO_2$ |
| Crude, untreated | 0.33 | 0.50 | 0.75 | 1 |
| Treated | 0.75 | 0.85 | 0.95 | 1 |

What is claimed is:

1. A process for the treatment of a metal oxide powder with a view to its fritting, which comprises forming said metal oxide being chosen from the group including uranium dioxide, plutonium dioxide, and the mixed oxides $UO_2$-$PUO_2$, $UO_2$-$ThO_2$, $ThO_2$-$PuO_2$, $UO_2$-$Gd_2O_3$, $UO_2$-$PuO_2$-$Eu_2O_3$ and $UO_2$-$PuO_2$-$Gd_2O_3$ a hydrated oxide layer of the same metal on the surface of the particles of said powder prior to compression of said powder into pellets by treating the powder with an oxidizing agent, in the presence of water or water vapor, drying the thus treated powder to eliminate the excess water, bringing the thus treated powder into the form of cylindrical pellets by cold compression; and fritting the thus obtained crude pellets at a temperature of 1400° to 1800° C. under a reducing atmosphere.

2. A process according to claim 1, wherein the oxidizing agent is hydrogen peroxide.

3. A process according to claim 2, wherein the powder is mixed with an aqueous hydrogen peroxide solution and the thus treated powder then undergoes drying to eliminate the excess water.

4. A process according to claim 3, wherein the hydrogen peroxide concentration of the solution is 4 to 30% by volume.

5. A process according to claim 3 or 4, wherein the solution quantity used represents 2 to 15% of the weight of oxide powder to be treated.

6. A process according to claim 1, wherein the oxidizing agent is ozone.

7. A process for the production of uranium dioxide pellets, which comprises:

(1) subjecting a uranium dioxide powder to a treatment according to claim 1 or 3, so as to form on the surface of said powder, an adhesive hydrated oxide layer $UO_2(OH)_2H_2O$;

(2) bringing the thus treated powder into the form of cylindrical pellets by cold compression; and (3) fritting the thus obtained crude pellets at a temperature of 1400° and 1800° C. under a reducing atmosphere.

* * * * *